United States Patent
Buchgraber et al.

(10) Patent No.: US 6,666,239 B2
(45) Date of Patent: Dec. 23, 2003

(54) FILLING PIPE FOR A FUEL TANK WITH INSERT

(75) Inventors: Markus Buchgraber, Ilz (AT); Wolfgang Suppan, Studenzen (AT)

(73) Assignee: Tesma-Motoren-und Getriebetechnik GmbH, Sinabelkirchen (AT)

( * ) Notice: Subject to any disclaimer, the term of this patent is extended or adjusted under 35 U.S.C. 154(b) by 0 days.

(21) Appl. No.: 10/267,130

(22) Filed: Oct. 8, 2002

(65) Prior Publication Data

US 2003/0084958 A1 May 8, 2003

(30) Foreign Application Priority Data

Oct. 9, 2001 (AT) .......................... 772/2001 U

(51) Int. Cl.$^7$ ................................. B65B 1/04
(52) U.S. Cl. ..................................... 141/286
(58) Field of Search ....................... 141/286, 301, 141/348; 220/86.2

(56) References Cited

U.S. PATENT DOCUMENTS 4,995,433 A    2/1991   Beicht et al.
5,735,322 A  * 4/1998   Palvolgyi ..................... 141/386
6,546,972 B1 * 4/2003   Foltz .......................... 141/349

FOREIGN PATENT DOCUMENTS

WO    WO 97/14572    4/1997

* cited by examiner

*Primary Examiner*—John Rivell
*Assistant Examiner*—Peter deVore
(74) *Attorney, Agent, or Firm*—Bachman & LaPointe, P.C.

(57) ABSTRACT

A filling pipe for a fuel tank comprises a housing which has, on its inner circumference, a number of inwardly directed threaded segments and at least one vertical indentation, the upper part of the housing has segmented threaded parts for screwing a closure cap therein, and its lower part, which is contracted to the diameter of the filling pipe, contains an insert. The insert has, on its outer circumference, a number of outwardly directed threaded segments and two outwardly directed lugs, the segments together with the inwardly directed threaded segments of the housing holding the insert in the longitudinal direction, and the lugs together with the at least one indentation form a safeguard against twisting.

7 Claims, 2 Drawing Sheets

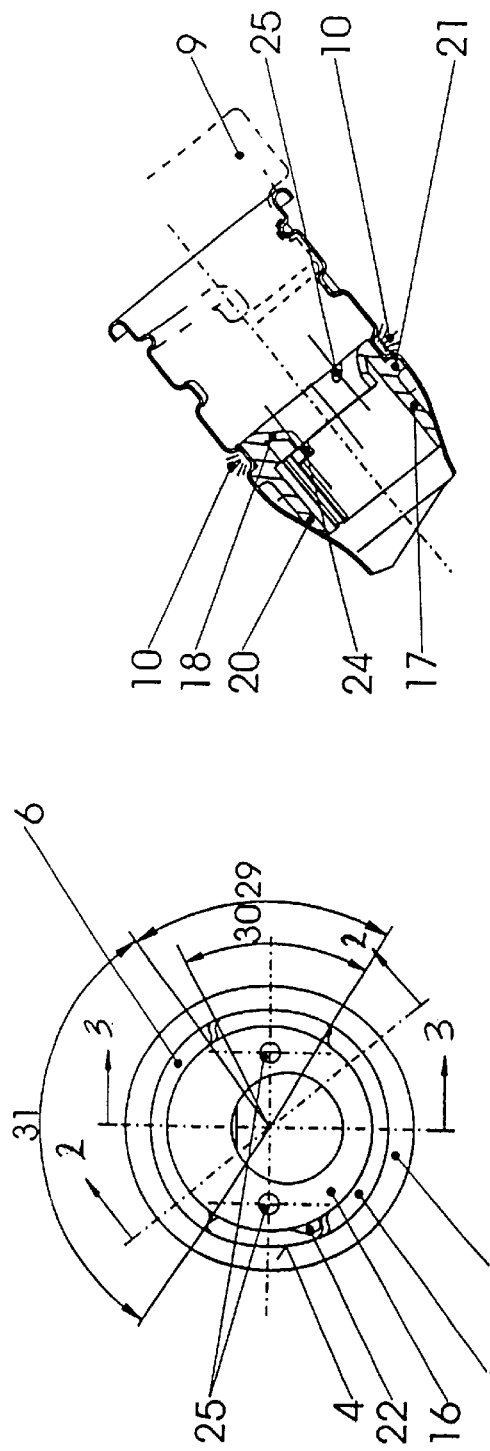
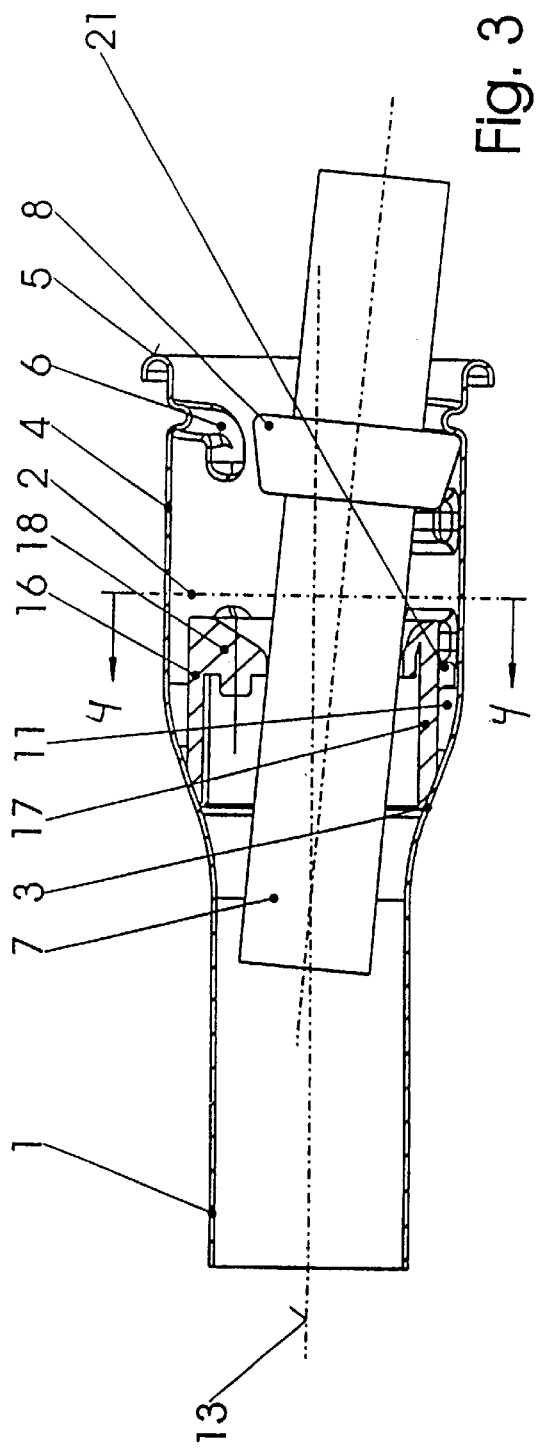

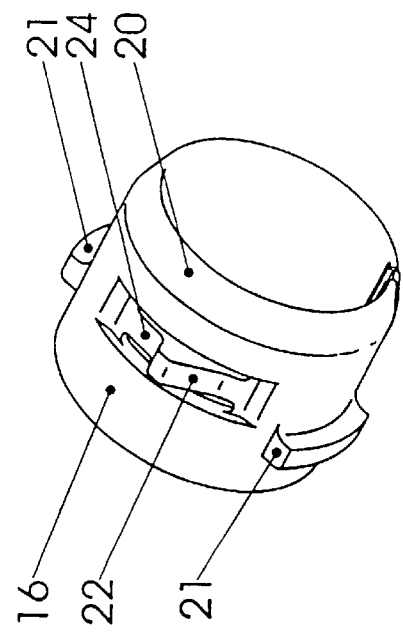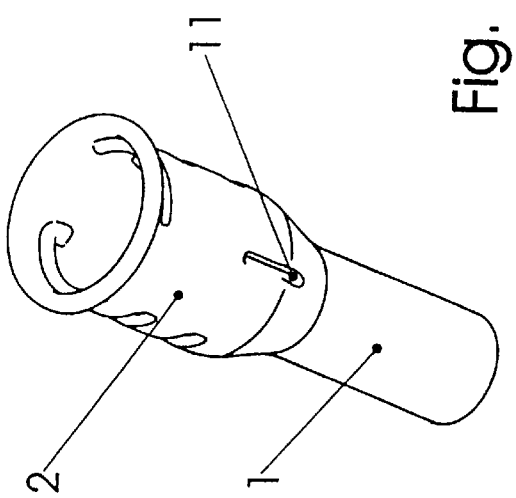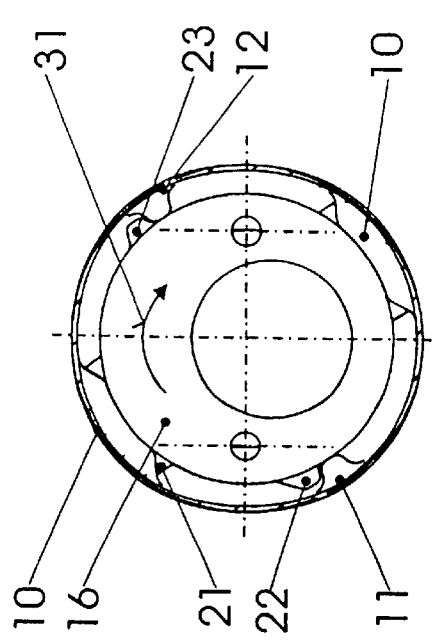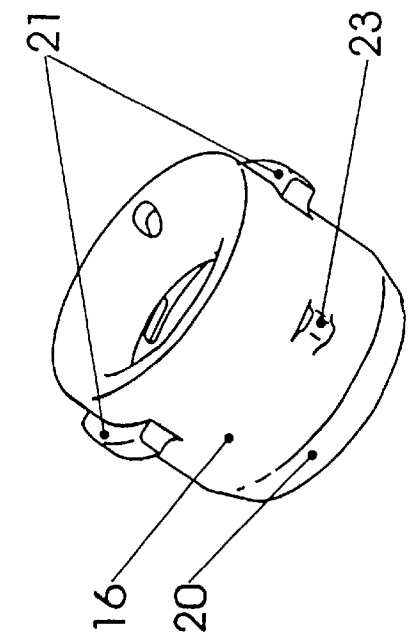

FILLING PIPE FOR A FUEL TANK WITH INSERT

BACKGROUND OF THE INVENTION

The invention relates to a filling pipe for a fuel tank having an enlarged housing for holding a closure cap, the housing contains an insert having a collar for selectively holding the outlet pipe of a fuel nozzle. The housing is, as a rule, a deep-drawn part made of sheet metal which adjoins the upper end of the filling pipe, forms an enlargement and then, as far as the outer end, is a cylinder of larger diameter. The insert serves, inter alia, for guiding the inner end of the inserted fuel nozzle. Different inserts are used depending in each case on the type of fuel, design variant and country of destination of the vehicle.

Housings, which are known from practice and into which the insert is inserted and is secured by flanging or crimping (a rolling method reducing the diameter) the housing, form the prior art. The upper part of the insert protrudes out of the housing and forms the thread for the closure cap. The insert has therefore to be connected tightly to the housing. Since the tightness cannot, however, be ensured in this manner, a seal has additionally to be inserted between the insert and housing before they are connected. This is labor-consuming and unreliable, requires complicated tool variants, a subsequent tightness check and, on top of everything else, it can no longer be detached. As a result, it cannot be interchanged when making repairs or if there are changes in the law.

A further disadvantage is that the connection has to take place mechanically and therefore already at the pre-installation stage. The differentiation between the different variants in the manufacturing process so far upstream is a very great disadvantage for the logistics.

It is therefore an object of the invention to improve the known filling pipes qualitatively with regard to production, logistical costs and interchangeability.

SUMMARY OF THE INVENTION

According to the invention, the foregoing object is achieved wherein the housing has, on its inner circumference, a number of inwardly directed threaded segments and at least one vertical indentation, in that furthermore the upper part of the housing has segmented threaded parts for screwing the closure cap into, and its lower part is contracted to the diameter of the filling pipe and contains an insert which has, on its outer circumference, a number of outwardly directed threaded segments and two outwardly directed lugs, the former together with the inwardly directed threaded segments of the housing holding the insert in the longitudinal direction, and the lugs together with the at least one indentation forming a safeguard against twisting.

The starting point is thus first of all to form the thread for the closure cap, which thread is generally an internal thread, on the insert. As a result, the seal between the housing and insert is spared. The threaded segments, lugs and indentations can be manufactured in an extremely simple manner and nevertheless with good accuracy.

The threaded segments permit the insert to be introduced into the interior of the housing without being twisted and, as a consequence, provide a bayonet-type connection to the housing. The lugs are used for safeguarding against twisting as soon as the insert, on being twisted, has reached its end position. It is thus ensured that the connection is not released, for example due to vibrations. In spite of this, the insert, or one of the many country-specific variants of an insert, can be inserted very simply and without effort in the vehicle even not until the later final installation, and can be interchanged at a later point.

In a preferred refinement, one of the two lugs forms a catch which can be pressed in elastically, and the other forms a stop, which lugs interact in each case with the at least one vertical indentation. When the end position is reached, rotation first of all takes place over the yielding catch until it snaps into place and at the same time the stop is also reached. Since the indentations extend in the longitudinal direction and only their circumferential position has to be precisely determined, they can be formed very easily at the same time as the housing, which consists of sheet metal, is deep-drawn. It is even better if two mutually opposite indentations are provided, of which one interacts with the catch and the other interacts with the stop.

In an advantageous development, the lower edge of the insert is of conical design on the outside and bears in a sealing manner against the lower part of the housing, which part is contracted to the diameter of the filling pipe. As a result, just one row of threaded segments is needed and a good fit of the insert is obtained.

Owing to the invention, the formation of the housing with an internal thread for holding a closure cap at its upper end is also possible by said housing having at said end segmented turns of an internal thread for holding a closure cap, the central angle of the distance between the turns being larger than the central angle of the outwardly directed threaded segments of the insert.

In a further refinement of the filling pipe according to the invention, the insert can have connecting means for an installation tool. If it is then also still a single part and consists of plastic the installation is particularly rapid and simple.

BRIEF DESCRIPTION OF THE DRAWINGS

The invention will be described and explained below with reference to figures, in which:

FIG. 1 shows a filling pipe according to the invention in plan view,

FIG. 2 shows a longitudinal section through line 2—2 of FIG. 1,

FIG. 3 shows a longitudinal section through line 3—3 of FIG. 1,

FIG. 4 shows a cross section through line 4—4 of FIG. 3,

FIG. 5 shows an axonometric view from the tank side,

FIG. 6 shows an axonometric view from the cap side,

FIG. 7 shows an axonometric view of the filling pipe, on a reduced scale.

DETAILED DESCRIPTION

In FIGS. 1, 2 and 3, the filling pipe is denoted by 1 and the housing adjoined thereto above it is denoted by 2. The filling pipe 1 merges without an interruption into the housing 2, but could also be connected thereto by means of suitable connecting elements. The housing 2 is formed from sheet metal or a pipe, and comprises a lower part 3, which is shaped to the diameter of the filling pipe 1, and a cylindrical part 4 which is adjoined thereto at the top and ends in a flange 5 which forms the sealing surface for a closure cap (9 in FIG. 2). Segmented threaded parts 6 are formed in the upper part 4, said parts extending over a central angle 31

(FIG. 1), and the distance or interruption between them encloses a central angle 29. In FIG. 3, the outlet pipe 7 of a fuel nozzle (further details not illustrated), which has a retaining collar 8, can also be seen. The closure cap 9 is indicated in FIG. 2 by dashed lines.

Under the segmented threaded parts 6, the housing has inwardly directed threaded segments 10 (FIGS. 2 and 4). The term threaded segments is to be interpreted here very generally, it may similarly involve bayonet-type ramps whose slope in the limiting case may also be zero. They are formed at the same time as the housing 2 is deep-drawn, in a similar manner as the first and second indentations 11, 12 which are elongate in the vertical direction (see FIG. 4 and FIG. 7). The longitudinal direction is given by the axis of symmetry 13.

Situated in the lower part 3 of the housing 2 is an insert 16 (see also FIGS. 5 and 6) which comprises an essentially cylindrical casing 17 and an inwardly directed collar 18 which leaves a hole 19 free for the insertion of the outlet pipe of the fuel nozzle. The hole 19 has different diameters depending in each case on the size of the outlet pipe (for example smaller outlet pipe for lead-free). Accordingly, inserts 16 with the same fitting dimensions can be inserted into the housing 2. However, the design of the entire insert may also be varied just as long as the dimensions relevant for fitting remain unchanged. The lower edge 20 of the insert 16 is of conical design and rests here in the constricted lower part 3 of the housing 2.

In the exemplary embodiment shown, the insert 16 has two mutually opposite, outwardly directed threaded segments 21 which, as can be seen in FIG. 4, fit into the inwardly directed threaded segments 10 of the housing 2 and accordingly can also be bayonet ramps without a slope. These threaded segments 21 enclose a central angle 30 (FIG. 1) which is smaller than the central angle 29 of the distance between the segmented threaded parts 6 in the upper part 4 of the housing 2. Furthermore, on the outside of the casing 17 of the insert 16 are two outwardly directed lugs 22, 23 (see FIGS. 5 and 6), of which one 22 is designed as a catch and the second 23 as a stop. The catch is part of an elastic bridge 24 over an aperture in the casing 17. Of course, the stop 23 cannot be pressed in.

Owing to its simple form, the entire insert 16 together with its threaded segments 21 and lugs 22, 23 can easily be produced as a single injection molded part (for example from plastic). Holes which are accessible from the outside and into which an installation tool can be inserted are denoted by 25. With these connecting means, the insert 16 can easily be introduced into the interior of the housing 2 in the correct angular position past the segmented threaded parts 6 and can be twisted there until the threaded segments 21 grip under the threaded segments 10 (rotation in the direction of arrow 31). In the end position, the catch 22 has been rotated over the first indentation and has sprung outward again, and the stop 23 bears against the second indentation 12. The insert is thus fixed in both directions of rotation.

Altogether, a particularly functionally suitable and nevertheless inexpensive filling pipe is thereby provided, into which the correct insert 16 can be inserted rapidly and simply just shortly before installation into the vehicle.

What is claimed is:

1. A filling pipe for a fuel tank having an enlarged housing for holding a closure cap, the housing containing an insert having a collar for selectively holding the outlet pipe of a fuel nozzle, wherein the housing has (a) an inner circumference provided with a plurality of inwardly directed threaded segments and at least one vertical indentation, (b) an upper part having segmented threaded parts for receiving a closure cap and (c) a lower part shaped to the diameter of the filling pipe and contains an insert, the insert has an outer circumference provided with a plurality of outwardly directed threaded segments and two outwardly directed lugs, wherein the outwardly directed threaded segments together with the inwardly directed threaded segments of the housing hold the insert in the longitudinal direction, and the lugs together with the at least one indentation form a safeguard against twisting.

2. The filling pipe as claimed in claim 1, wherein one of the two lugs of the insert forms a catch and the other forms a stop, wherein the lugs interact in each case with the at least one vertical indentation.

3. The filling pipe as claimed in claim 2, wherein two mutually opposite indentations are provided, wherein one interacts with the catch and the other interacts with the stop.

4. The filling pipe as claimed in claim 1, wherein a lower edge of the insert has a conical design on an outside surface and bears against the lower part of the housing in an area which is shaped to the diameter of the filling pipe.

5. The filling pipe as claimed in claim 1, wherein the housing has segmented threaded parts of an internal thread at its upper end for holding a closure cap, wherein the central angle of the distance between the threaded parts is larger than the central angle of the outwardly directed threaded segments of the insert.

6. The filling pipe as claimed in claim 1, wherein the insert has connecting means for an installation tool.

7. The filling pipe as claimed in claim 1, wherein the insert is a single part and consists of plastic.

* * * * *